J. M. SKINNER & V. R. BOTTONE.
ELECTRIC STORAGE BATTERY.
APPLICATION FILED APR. 9, 1914.
1,169,362.
Patented Jan. 25, 1916.
2 SHEETS—SHEET 1.
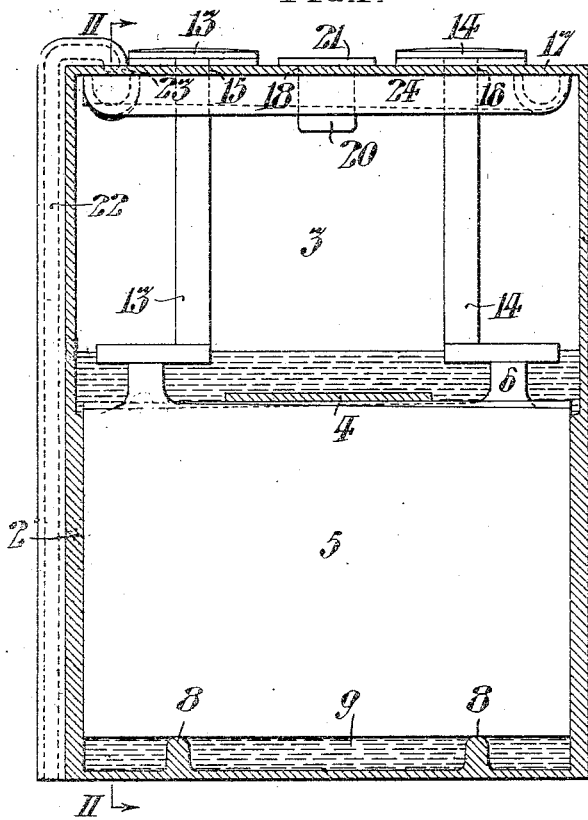
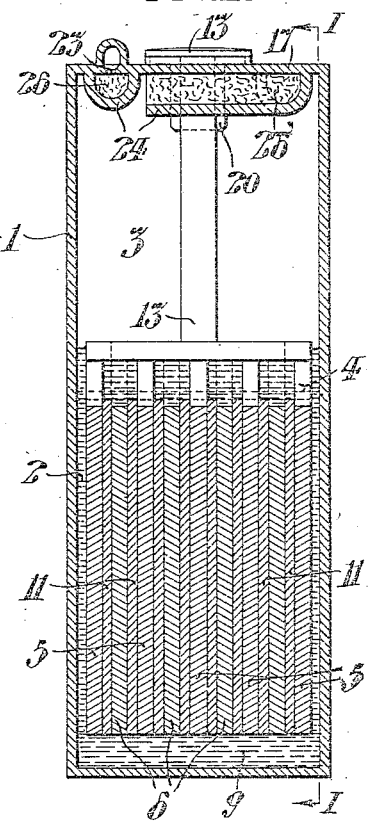
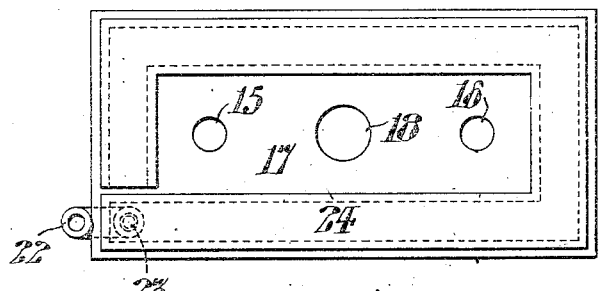
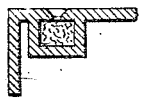
WITNESSES:
Philip W. Vessey.
Joseph E. Segal.
INVENTOR:
James Mortimer Skinner
and Victor Roles Bottone,
by Arthur E. Paige
Attorney.

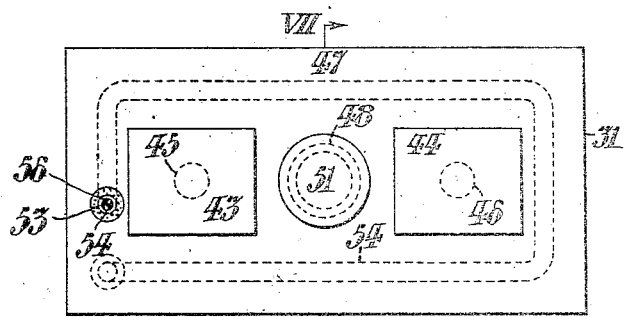
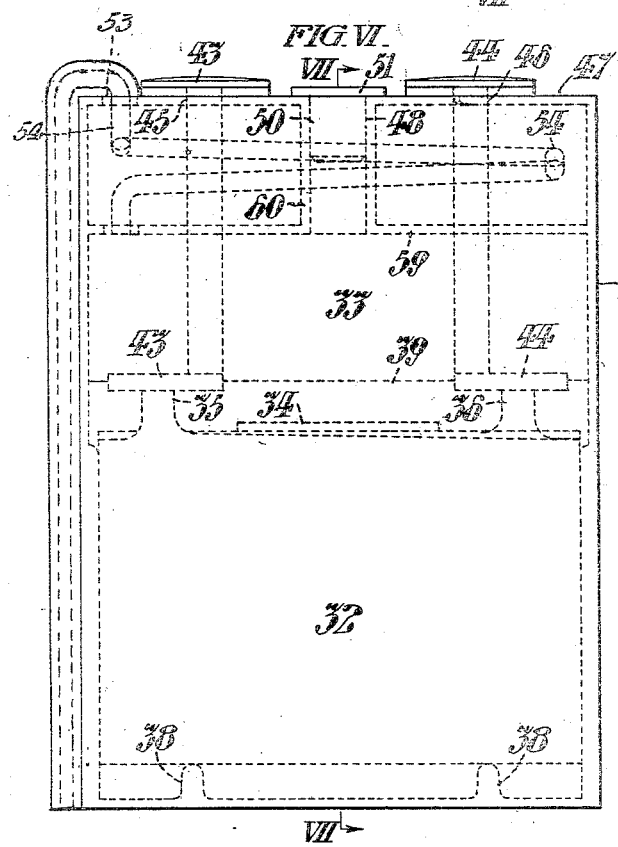
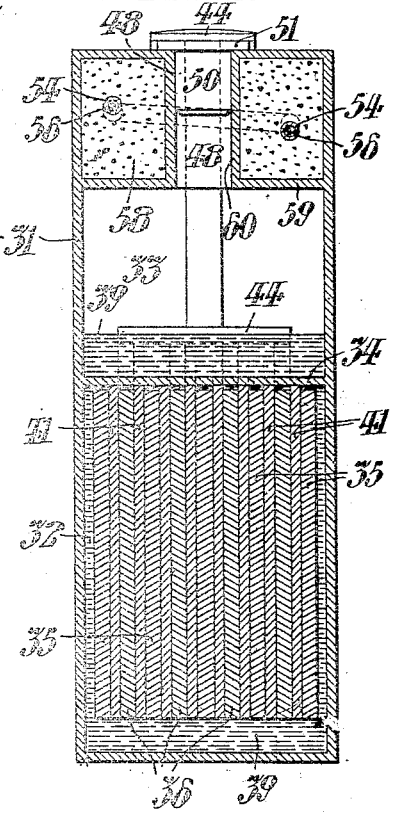

UNITED STATES PATENT OFFICE.

JAMES MORTIMER SKINNER AND VICTOR ROLES BOTTONE, OF PHILADELPHIA, PENNSYLVANIA.

ELECTRIC STORAGE BATTERY.

1,169,362.  Specification of Letters Patent.  Patented Jan. 25, 1916.

Application filed April 9, 1914. Serial No. 830,623.

*To all whom it may concern:*

Be it known that we, JAMES MORTIMER SKINNER, a citizen of the United States, and VICTOR ROLES BOTTONE, a citizen of England, both residents of Philadelphia, in the county of Philadelphia and State of Pennsylvania, have invented a certain new and useful Improvement in Electric Storage Batteries, whereof the following is a specification, reference being had to the accompanying drawing.

Our invention relates to batteries which are adapted for general use, and particularly for mine lamps. As such batteries are liable to be violently shaken, during operation, they include cells or outer casings which are substantially closed to prevent spilling the electrolyte. However, as gas is formed by electrolytic action within such casings, the latter must be provided with means to permit the escape of such gas.

Therefore, it is an object of our invention to provide such a storage battery with a casing having a vent device permitting the escape of gas without permitting the escape of the liquid electrolyte.

As hereinafter described, our invention includes an electric storage battery having a casing containing a plate compartment in its lower portion and a gas compartment in its upper portion; plates in said plate compartment having terminals extending exterior to said casing; a liquid electrolyte in said plate compartment, but in communication with said gas compartment; and a vent device including an outer vertical conduit in communication with an opening through the wall of said casing, a conduit, in communication with said opening, extending transversely in said casing, and opening at its inner end into said gas compartment; so constructed and arranged with reference to the quantity of said electrolyte that the latter is normally prevented from reaching the open outer end of said vent conduit, through which the gas escapes. As hereinafter described, said casing is conveniently made rectangular, and the portion of said conduit which is carried by the lid of the casing extends horizontally in the casing successively parallel with the sides thereof, and may be formed of a primarily flexible rubber tube having means holding it rigid. In any case, the bottom of said conduit is preferably inclined downwardly within the casing, so that any of the electrolyte accidentally finding its way into said conduit, gravitates therefrom into said casing when the latter is in its normal upright position.

Our invention includes the various novel features of construction and arrangement hereinafter more definitely specified.

In the drawings: Figure I is a vertical longitudinal sectional view of a storage battery conveniently embodying our invention, section being taken on the line I, I in Fig. II. Fig. II is a vertical transverse sectional view of said battery, section being taken on the line II, II in Fig. I. Fig. III is an inverted plan view of the lid of the casing shown in Figs. I and II. Fig. IV is a fragmentary sectional view, similar to the upper left hand corner of Fig. II, but showing a modified form of conduit. Fig. V is a plan view of a battery embodying a modified form of our invention. Fig. VI is a front elevation of the battery shown in Fig. V. Fig. VII is a central vertical sectional view of said battery, taken on the line VII, VII in Figs. V and VI.

The storage battery shown in Figs. I, II and III includes the invertible rectangular casing 1 containing the plate compartment 2 in its lower portion and the gas compartment 3 in its upper portion. The partition 4 which is in rigid relation with said casing 1, between said two compartments, permits fluid communication between them. The plates 5 and 6 in said plate compartment 2 are held by said partition 4 upon the supporting ribs 8, at the bottom of said casing, which permit the flow of liquid acid electrolyte 9 beneath said plates, which are held in separated relation by the porous separators 11 which are preferably formed of wood deprived of such of its constituents as might interfere with the electrolytic action or efficiency of the battery. Said electrolyte 9 extends above said partition 4 and in communication with said gas compartment 3. Said plates are held in assembled relation as shown, by their respective terminals 13 and 14 which extend exterior to said casing 1 through the respective openings 15 and 16 in the lid 17 of said casing. Said lid 17 has the central opening 18, through which the electrolyte 9 may be introduced and removed; said opening being normally closed by the plug 20 having the head 21 which may be sealed exterior to said lid. Said lid 17, is shown detached in Fig. III, but is cemented in integral relation with said casing 1, so as to form the top wall thereof, as shown in Fig. I. Said casing 1 has the vent device including the outer conduit 22 in communication with the vent opening 23 leading from the interior of said casing 1, through said lid 17, to the atmosphere; and the inner conduit 24, in communication with said opening 23, extending horizontally in said casing 1 successively parallel with the sides thereof, and open at its inner end in communication with said gas compartment 3 as shown in Fig. II. The bottom of said conduit 24 is inclined downwardly from said opening 23 toward its inner end, so that any of said electrolyte 9 which may find its way therein shall return by gravitation to the interior of said casing; and said conduit may be filled with splash preventing material 26, which permits the escape of gas through said conduit but checks the flow of liquid therethrough. Said material 26 may be porous.

Said casing 1, partition 4, lid 17, conduit 24 and plug 20 are conveniently formed of any suitable flexible material, preferably transparent celluloid, which permits inspection of the interior of the battery through the casing walls.

It may be observed that in the form of our invention above described, the vent device is carried by the lid 17 and may be primarily formed entirely independently of the casing 1, to which it is subsequently cemented, as above contemplated. However, it is to be understood that vent devices may be otherwise constructed in accordance with our invention, for instance, they may be carried by the casings independently of their lids, or be suspended in the sealing compound, without connection with either. The battery shown in Figs. V, VI and VII includes a vent device which is not carried by the upper wall or lid of the invertible rectangular casing 31, which is otherwise similar to said casing 1. Said casing 31 contains the plate compartment 32 in its lower portion and the gas compartment 33 in its upper portion, and the partition 34 which is in rigid relation with said casing 31, between said two compartments, permits fluid communication between them. The plates 35 and 36 in said plate compartment 32 are held by said partition 34 upon the supporting ribs 38, at the bottom of said casing, which permit the flow of liquid acid electrolyte 39 between said plates which are held in separated relation by the porous separators 41, like the separators 11 above described. Said electrolyte 39 extends above said partition 34 and in communication with said gas compartment 33. Said plates are held in the assembled relation shown, by their respective terminals 43 and 44 which extend exterior to said casing 31 through the respective openings 45 and 46 in the lid 47 of said casing 31. Said lid 47 has the central opening 48 through which the electrolyte 39 may be introduced and removed; said opening being normally closed by the plug 50 having the head 51 which may be sealed exterior to said lid. Said lid 47 which is primarily detached, like the lid 17 shown in Fig. III, but which is cemented in integral relation with said casing 31, so as to form the top wall thereof, as shown in Figs. VI and VII, has a vent device including the outer opening 53 leading from the interior of said casing 31 to the atmosphere, and the conduit 54 in communication with said opening 53, extending transversely in said casing 31 successively parallel with the sides thereof and open at its inner end in communication with said gas compartment 33 as shown in Fig. VI. The bottom of said conduit 54 is inclined downwardly from said outer opening 53 toward its inner end, so that any of said electrolyte 39 which may find its way therein shall return by gravitation to the interior of said casing, and said conduit may be filled with porous, splash preventing material 56, which permits the escape of gas through said conduit but checks the flow of liquid therethrough. Said conduit 54 is conveniently formed of a primarily flexible rubber tube, having means holding it rigid, including the plastic compound 58 and the horizontal partition 59 supporting said compound above said gas compartment 33, as shown in Figs. VI and VII. Referring to Figs. VI and VII, it may be observed that said partition 59 is connected in integral relation with said lid 47 by the central tube 60 which surrounds said central opening 48. It is to be understood that said elements of the vent device may be assembled by first cementing said partition 59 in the casing 31, then filling the space above it with the sealing compound 58, embedding said conduit 54 and tube 60, and then cementing said lid 47 in said casing, or, the entire vent device, including the elements 47, 54, 58, 59 and 60, may be assembled apart from the casing 31, and then connected with the latter, like the lid 17 above described. In other words, said vent device including the conduit 54, may be carried by the lid 47. Moreover, such primarily flexible conduits may be supported in operative position by means which do not hold them rigid.

It may be observed that although in both forms of our invention above described the vent devices of the respective battery cells or casings, 1 and 31, normally permit the escape of gas and thus prevent the accumulation of fluid pressure within said casings, above that of the outer atmosphere; it is impossible for the liquid electrolyte to escape under normal conditions. However, by continuously holding said casings in inverted position the electrolyte may be caused to seep through said openings 23 and 53; but such manipulation is, of course, entirely abnormal, and, under normal conditions of use or misuse, said casings are impermeable by the electrolyte, even if the porous, splash preventing material above contemplated be omitted from the passageways through which the gas escapes. As shown in Fig. V, said opening 53 communicates with an outer vertical conduit, like the conduit 22, to receive such seepage, when the battery is inverted, and from which the electrolyte may be drained back into the battery casing. Said conduit may be integral with said casing, or otherwise.

Moreover, although we prefer to form each gas passageway in sections extending successively in different directions; such construction and arrangement is not essential. Therefore, we do not desire to limit ourselves to the precise details of construction and arrangement herein set forth, as it is obvious that various modifications may be made therein without departing from the essential features of our invention as defined in the appended claims.

We claim:—

1. An electric storage battery including a rectangular casing; a vent device including an outer opening in the top wall of said casing, a conduit in communication with said opening extending horizontally in said casing, successively parallel with the sides thereof, and in communication with said gas compartment, formed of a flexible rubber tube; means holding said tube rigid, including a plastic compound, and a horizontal partition supporting said compound, above said gas compartment; the bottom of said conduit being inclined downwardly from said outer opening toward its inner end; and porous, splash preventing, material in said conduit; whereby gas arising in said gas chamber from electrolytic action in said casing may escape through the tortuous passageway beginning with the inner end of said conduit and terminating with said vent opening to the atmosphere, without permitting the escape of the electrolyte.

2. An electric storage battery including a casing; a vent device including an outer opening in the wall of said casing, a conduit in communication with said opening extending transversely in said casing, successively parallel with the sides thereof, and in communication with said gas compartment, formed of a tube; and means holding said tube rigid, including a plastic compound, and a horizontal partition supporting said compound, above said gas compartment; the bottom of said conduit being inclined downwardly from said outer opening toward its inner end; whereby gas arising in said gas chamber from electrolytic action in said casing may escape through the tortuous passageway beginning with the inner end of said conduit and terminating with said vent opening to the atmosphere, without permitting the escape of the electrolyte.

3. An electric storage battery including a casing; a vent device including an outer opening in the wall of said casing, a conduit in communication with said opening extending transversely in said casing, successively parallel with the sides thereof, and in communication with said gas compartment, formed of a tube; and means holding said tube rigid, including a plastic compound, above said gas compartment; the bottom of said conduit being inclined downwardly from said outer opening toward its inner end; whereby gas arising in said gas chamber from electrolytic action in said casing may escape through the tortuous passageway beginning with the inner end of said conduit and terminating with said vent opening to the atmosphere, without permitting the escape of the electrolyte.

4. An electric storage battery including a casing; a vent device including an outer opening in the top wall of said casing, a conduit in communication with said opening extending horizontally in said casing, successively parallel with the sides thereof, and in communication with said gas compartment, formed of a tube; and means holding said tube rigid, above said gas compartment; the bottom of said conduit being inclined downwardly from said outer opening toward its inner end; whereby gas arising in said gas chamber from electrolytic action in said casing may escape through the tortuous passageway beginning with the inner end of said conduit and terminating with said vent opening to the atmosphere, without permitting the escape of the electrolyte.

5. An electric storage battery including a casing; a vent device including an outer opening in the top wall of said casing, a conduit in communication with said opening extending horizontally in said casing, successively parallel with the sides thereof, and in communication with said gas compartment, formed of a tube; and means holding said tube rigid, above said gas compartment; whereby gas arising in said gas chamber from electrolytic action in said casing may escape through the tortuous passageway beginning with the inner end of said conduit and terminating with said vent opening to the atmosphere, without permitting the escape of the electrolyte.

6. An electric storage battery including a casing; a vent device including an outer opening in the wall of said casing, a conduit in communication with said opening extending transversely in said casing, in communication with said gas compartment; and means holding said conduit rigid, above said gas compartment; whereby gas arising in said gas chamber from electrolytic action in said casing may escape through the tortuous passageway beginning with the inner end of said conduit and terminating with said vent opening to the atmosphere.

7. An electric storage battery casing having a gas vent opening in its top; a conduit in communication with said opening, extending within said casing successively substantially parallel with the vertical walls thereof, forming a tortuous passageway, having a gas inlet; and a conduit exterior to said casing, in communication with said opening, extending parallel with one of said walls, toward the bottom thereof.

8. An electric storage battery casing having a gas vent opening; a conduit in communication with said opening, extending within said casing successively substantially parallel with the vertical walls thereof, forming a tortuous passageway, having a gas inlet; and a conduit exterior to said casing, in communication with said opening, extending parallel with one of said walls, toward the bottom thereof.

In testimony whereof, we have hereunto signed our names at Philadelphia, Pennsylvania, this seventh day of April, 1914.

JAMES MORTIMER SKINNER.
VICTOR ROLES BOTTONE.

Witnesses:
   JOHN S. THOMAS,
   EDWARD DAVIS.